(12) United States Patent
Dulitz et al.

(10) Patent No.: US 7,568,034 B1
(45) Date of Patent: Jul. 28, 2009

(54) SYSTEM AND METHOD FOR DATA DISTRIBUTION

(75) Inventors: Daniel Dulitz, Mountain View, CA (US); Sanjay Ghemawat, Mountain View, CA (US); Bwolen Po-Jen Yang, Sunnyvale, CA (US); Keith H. Randall, Mountain View, CA (US); Anurag Acharya, Campbell, CA (US)

(73) Assignee: Google Inc., Mountain View, CA (US)

( * ) Notice: Subject to any disclaimer, the term of this patent is extended or adjusted under 35 U.S.C. 154(b) by 1172 days.

(21) Appl. No.: 10/613,626

(22) Filed: Jul. 3, 2003

(51) Int. Cl.
*G06F 15/173* (2006.01)

(52) U.S. Cl. .................................................... 709/226

(58) Field of Classification Search ................. 709/208, 709/211, 223, 226, 242; 718/104, 105; 711/161–162; 707/200, 203, 204
See application file for complete search history.

(56) References Cited

U.S. PATENT DOCUMENTS

| | | | |
|---|---|---|---|
| D295,632 S | 5/1988 | Wells-Papanek et al. | |
| D295,764 S | 5/1988 | Wells-Papanek et al. | |
| 5,721,914 A * | 2/1998 | DeVries | 707/10 |
| D396,455 S | 7/1998 | Bier | |
| 5,884,031 A * | 3/1999 | Ice | 709/203 |
| 5,913,026 A | 6/1999 | Bleidt et al. | |
| 5,920,701 A * | 7/1999 | Miller et al. | 709/228 |
| 6,070,191 A * | 5/2000 | Narendran et al. | 709/226 |
| 6,098,078 A * | 8/2000 | Gehani et al. | 707/203 |
| 6,134,596 A | 10/2000 | Bolosky et al. | |
| 6,141,762 A * | 10/2000 | Nicol et al. | 713/300 |
| 6,189,039 B1 * | 2/2001 | Harvey et al. | 709/232 |
| 6,223,226 B1 | 4/2001 | Miyahara | |
| 6,370,580 B2 * | 4/2002 | Kriegsman | 709/226 |
| 6,374,336 B1 | 4/2002 | Peters et al. | |
| 6,427,172 B1 | 7/2002 | Thacker et al. | |
| 6,467,046 B1 * | 10/2002 | Cunliffe et al. | 714/6 |
| 6,477,548 B1 * | 11/2002 | Nihei | 707/204 |
| 6,477,566 B1 | 11/2002 | Davis et al. | |
| 6,484,204 B1 * | 11/2002 | Rabinovich | 709/226 |
| D469,444 S | 1/2003 | Ording et al. | |

(Continued)

OTHER PUBLICATIONS

Adam et al., "Regeneration with Virtual Copies for Distributed Systems", IEEE vol. 19, No. 6, Jun. 1993.*

(Continued)

*Primary Examiner*—J Bret Dennison
(74) *Attorney, Agent, or Firm*—Morgan, Lewis & Bockius LLP

(57) ABSTRACT

A method of distributing files operates in a system having a master and a plurality of slaves, interconnected by a communications network. Each slave determines a current file length for each of a plurality of files and sends slave status information to the master, the slave status information including the current file length for each file. The master schedules copy operations based on the slave status information. The master stores bandwidth capability information indicating data transmission bandwidth capabilities for the resources required to transmit data between the slaves, and also stores bandwidth usage information indicating a total allocated bandwidth for each resource. For each schedule copy operation, an amount of data transmission bandwidth is allocated and the stored bandwidth usage information is updated accordingly. The master only schedules copy operations that do not cause the total allocated bandwidth of any resource to exceed the bandwidth capability of that resource.

42 Claims, 10 Drawing Sheets

U.S. PATENT DOCUMENTS

| | | | |
|---|---|---|---|
| D472,244 S | 3/2003 | Wasko | |
| D473,565 S | 4/2003 | Groves | |
| D474,201 S | 5/2003 | Chaudhri et al. | |
| 6,606,643 B1* | 8/2003 | Emens et al. | 709/203 |
| 6,618,752 B1* | 9/2003 | Moore et al. | 709/217 |
| 6,671,705 B1* | 12/2003 | Duprey et al. | 707/204 |
| 6,718,361 B1* | 4/2004 | Basani et al. | 709/201 |
| 6,859,839 B1* | 2/2005 | Zahorjan et al. | 709/231 |
| 6,901,604 B1* | 5/2005 | Kiraly | 725/93 |
| 6,970,937 B1* | 11/2005 | Huntington | 709/231 |
| 6,990,667 B2* | 1/2006 | Ulrich et al. | 718/105 |
| 6,996,668 B2* | 2/2006 | Gaertner et al. | 711/113 |
| 7,035,933 B2* | 4/2006 | O'Neal et al. | 709/233 |
| 7,039,173 B2* | 5/2006 | Tuunanen | 379/221.12 |
| 7,065,618 B1* | 6/2006 | Ghemawat et al. | 711/161 |
| 7,325,073 B2* | 1/2008 | Shao et al. | 709/238 |
| 2002/0059416 A1* | 5/2002 | Tuunanen | 709/223 |
| 2002/0059592 A1* | 5/2002 | Kiraly | 725/37 |
| 2002/0103968 A1* | 8/2002 | Grover | 711/114 |
| 2002/0138559 A1* | 9/2002 | Ulrich et al. | 709/203 |
| 2002/0194324 A1* | 12/2002 | Guha | 709/223 |
| 2003/0014523 A1* | 1/2003 | Teloh et al. | 709/226 |
| 2003/0028726 A1* | 2/2003 | Gaertner et al. | 711/114 |
| 2003/0046283 A1 | 3/2003 | Roberts | |
| 2003/0101278 A1* | 5/2003 | Garcia-Luna-Aceves et al. | 709/240 |
| 2003/0131193 A1* | 7/2003 | Kodama et al. | 711/114 |
| 2003/0200307 A1* | 10/2003 | Raju et al. | 709/224 |
| 2003/0204571 A1* | 10/2003 | Waltermann | 709/214 |
| 2003/0212869 A1* | 11/2003 | Burkey | 711/162 |
| 2003/0225884 A1* | 12/2003 | Hayden | 709/226 |
| 2004/0019721 A1* | 1/2004 | Drerup et al. | 710/110 |
| 2004/0093361 A1* | 5/2004 | Therrien et al. | 707/204 |
| 2004/0143672 A1* | 7/2004 | Padmanabham et al. | 709/231 |
| 2004/0223615 A1* | 11/2004 | Dhawan | 380/261 |
| 2004/0260873 A1* | 12/2004 | Watanabe | 711/114 |
| 2005/0015436 A1* | 1/2005 | Singh et al. | 709/203 |
| 2005/0273514 A1* | 12/2005 | Milkey et al. | 709/232 |
| 2006/0129775 A1* | 6/2006 | Hulsey | 711/162 |
| 2006/0271705 A1* | 11/2006 | Garcia-Luna-Aceves | 709/242 |
| 2007/0174471 A1* | 7/2007 | Van Rossum | 709/229 |
| 2008/0005780 A1* | 1/2008 | Singleton | 726/1 |
| 2008/0016028 A1* | 1/2008 | Wilding et al. | 707/1 |

OTHER PUBLICATIONS

Cerf et al., "RFC 675—Specification of Internet Transmission Control Program" Dec. 1974, 141 pages.*

Wolfson, Ouri, "Distributed Algorithms For Dynamic Replication of Data", 1992.*

Wolfson, Ouri, "An Adaptive Data Replication Algorithm" ACM Transactions on Database Systems, vol. 22, No. 2, Jun. 1997, pp. 255-314.*

Chawathe, Y., "Scattercast: An Architecture for Internet Broadcast Distribution as an Infrastructure Service," Ph.D. Dissertation, University of California at Berkeley, Fall 2000, http://berkeley.chawathe.com/thesis/thesis-single.pdf.

Chawathe, Y. et al., "An Architecture for Internet Content Distribtion as an Infrastructure Service," Feb. 2000. Unpublished work. http://www.citeseer.ist.psu.edu/chawathe00architecture.html.

RFC 959: File Transfer Protocol (FTP), Oct. 1985.

Cohen, B., "Incentives Build Robustness in BitTorrent," May 22, 2003, http://bitconjurer.org/BitTorrent/bittorrentecon.pdf.

Osokine, S., "Search Optimization in the Distributed Networks," Oct. 15, 2002, www.grouter.net/gnutella/search.htm.

Padmanabhan, V., et al. "Distributing Streaming Media Content Using Cooperative Networking," NOSSDAV '02, May 12, 2002, and Microsoft Research Technical Report, MSR-TR-2002-37, Apr. 2002.

Bawa, M. et al., Transience of Peers and Streaming Media, Hotnets, 2002.

Nguyen, T. and Zahkor, A., "Distributed Video Streaming Over Internet," Multimedia Computing and Networking. Jan. 2002.

Rowstron, A. and Druschel, P., "Storage management and caching in PAST, a large-scale, persistent peer-to-peer storage utility," ACM SOSP, Oct. 2001.

Stoica, I. et al., "Chord: A Scalable Peer-to-peer Lookup Service for Internet Applications," ACM SIGCOMM, Aug. 2001.

Zhao, B., et al., "Tapestry: An Infrastructure for Fault-tolerant Wide-area Location and Routing," Technical Report UCB/CSD-01-1141, Computer Science Division, University of California at Berkeley, Apr. 2001.

* cited by examiner

FileSet 224
| FileID | Version |
|---|---|
| File001 | 022 |
| File002 | 025 |
| File002abc | 002 |
| ⋮ | ⋮ |
225 encompasses the three rows above.
FIG. 2B
Slave State 226
| FileID | Version | File Size |
|---|---|---|
| FileSet07 | 096 | 10KB |
| File001 | 022 | 0 |
| File002 | 025 | 16MB |
| File002abc | 002 | 64MB |
| ⋮ | ⋮ | ⋮ |
FIG. 2C
Data File 228
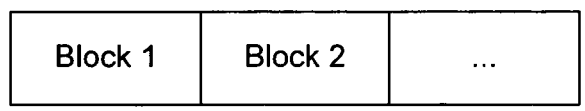
Checksum File 230
FIG. 2D System Hierarchy Table 380

Slave Level Graph 386

| Slave ID | Slave Location |
|---|---|
| Slave 1 | R1 |
| Slave 2 | R1 |
| . . . | R1 |
| Slave 17 | R2 |
| Slave 18 | R2 |
| . . . | R2 |
| Slave 134 | R35 |
| Slave 135 | R35 |
| . . . | . . . |
| Slave 452 | R139 |

Rack Level Graph 388

| Rack ID | Rack Location |
|---|---|
| Rack 1 | DC1 |
| Rack 2 | DC1 |
| . . . | DC1 |
| Rack 35 | DC2 |
| . . . | . . . |
| Rack 120 | DC4 |
| . . . | . . . |
| Rack 139 | DC4 |

FIG. 3B

System Resources Table 382

| Slave ID | Inbound BW | In BW in use | Outbound BW | Out BW in use |
|---|---|---|---|---|
| Slave 1 | 100 | 0 | 100 | 20 |
| Slave 2 | 100 | 20 | 100 | 80 |
| ... | ... | ... | ... | ... |
| Slave 34 | 100 | 80 | 100 | 10 |
| Slave 35 | 70 | 10 | 70 | 10 |
| ... | ... | ... | ... | ... |
| Slave 159 | 100 | 0 | 100 | 80 |
| Slave 160 | 100 | 10 | 100 | 0 |
| ... | ... | ... | ... | ... |
| Salve 756 | 100 | 0 | 100 | 0 |

Slave Level Bandwidth Graph 321

| Rack ID | Inbound BW | In BW in use | Outbound BW | Out BW in use |
|---|---|---|---|---|
| Rack 1 | 300 | 0 | 300 | 120 |
| Rack 2 | 300 | 40 | 300 | 80 |
| ... | ... | ... | ... | ... |
| Rack 17 | 300 | 80 | 300 | 0 |
| ... | ... | ... | ... | ... |
| Rack 34 | 250 | 100 | 250 | 60 |
| ... | ... | ... | ... | ... |
| Rack 123 | 300 | 10 | 300 | 0 |

Rack Level Bandwidth Graph 325

| Datacenter ID | Inbound BW | In BW in use | Outbound BW | Out BW in use |
|---|---|---|---|---|
| DC 1 | 500 | 0 | 500 | 120 |
| DC 2 | 500 | 40 | 500 | 80 |
| ... | ... | ... | ... | ... |
| DC 4 | 400 | 80 | 400 | 0 |

Datacenter Level Bandwidth Graph 327

Trunk Level Bandwidth Graph 328

| Trunk ID | BW | BW in use | Start | End | Latency |
|---|---|---|---|---|---|
| T1 | 25 | 0 | DC1 | DC2 | 100 ms |
| T2N | 50 | 40 | DC1 | DC3 | 100 ms |
| T2S | 100 | 100 | DC3 | DC1 | 50 ms |
| T3W | 30 | 0 | DC3 | DC4 | 45 ms |
| T3E | 30 | 20 | DC2 | DC4 | 15 ms |
| T4 | 30 | 20 | DC2 | DC3 | 35 ms |

FIG. 3C

Pending Tx Table 384

| Copy From | Copy To | BW used | End Time | Reserve Flag |
|---|---|---|---|---|
| Slave 1 | Slave 23 | 10 | 8:25 | 0 |
| Slave 2 | Slave 134 | 20 | 8:21 | 0 |
| . . . | . . . | ... | ... | ... |
| Slave 34 | Slave 35 | 10 | 8:22 | 0 |
| Slave 35 | Slave 87 | 10 | 10:36 | 1 |
| . . . | . . . | ... | ... | ... |
| Slave 89 | Slave 191 | 10 | 9:25 | 1 |
| . . . | . . . | ... | ... | ... |
| Slave 189 | Slave 199 | 100 | 8:23 | 0 |

FIG. 3D

State Table 392

| Resource ID | State | Failure Count | Attempts |
|---|---|---|---|
| T1 | 1 | 10 | 255 |
| ... | ... | ... | ... |
| TJ | 1 | 0 | 505 |
| DC1 | 1 | 1 | 543 |
| ... | ... | ... | ... |
| DCK | 1 | 0 | 123 |
| Rack 123 | 1 | 5 | 5678 |
| Rack 124 | 1 | 0 | 1003 |
| ... | ... | ... | ... |
| Rack N | 1 | 8 | 102 |

| | | | | Last Contact | State Pointer |
|---|---|---|---|---|---|
| Slave 1 | 1 | 2 | 122 | 01:02:03 | |
| Slave 2 | 0 | 50 | 98 | 00:01:00 | |
| Slave 3 | 1 | 1 | 57 | 01:02:08 | |
| ... | ... | ... | ... | ... | |
| Slave M | 1 | 1 | 89 | 01:02:01 | |

Slave3-R2-DC1 State:

| FileID | Version | File Size | Failure Cnt | Attempts | State | Want Newest |
|---|---|---|---|---|---|---|
| FileSet07 | 096 | 10KB | 0 | 7 | 1 | 1 |
| File001 | 032 | 0 | 0 | 0 | 0 | 0 |
| File002 | 035 | 16MB | 1 | 4 | 1 | 0 |
| File003abc | 002 | 64MB | 2 | 9 | 1 | 0 |
| ... | ... | ... | ... | ... | ... | ... |

Pointer to list of slaves with same files ~ 600

List of slaves having the files in FileSet07 ~ 602

FIG. 3E

SYSTEM AND METHOD FOR DATA DISTRIBUTION

BACKGROUND OF THE INVENTION

1. Field of the Invention

The invention relates generally to data distribution. More particularly, the invention is directed to a system and method for distributing large amounts of data over a widely dispersed network.

2. Description of Related Art

Data distribution, otherwise known as data deployment, data logistics, or data replication, includes the placement and maintenance of replicated data at multiple data sites across a network. Historically, data distribution has been either point-to-point, i.e., communication from one location to another, or multipoint, i.e., communication from one location to many. However, such data distribution has many drawbacks. For example, if multiple clients simultaneously request the same file from the server, the server may become overloaded and no longer be able to respond efficiently to normal requests. This is commonly known as denial of service.

Clients and servers are often widely distributed from one another. Therefore, communication between the clients and server may consume valuable system resources, where system resources are the components that provide the network's inherent capabilities and contribute to its overall performance. System resources include routers, switches, dedicated digital circuits, bandwidth, memory, hard disk space, etc. Unlike in public networks, such as the Internet, system resources are of particular value in private networks, where such system resources are typically paid for by a single system operator.

Still further, distributing data between widely dispersed data sites is often unreliable, as the further the distance between data sites the higher the probability of delays, packet loss, and system malfunction. Such data distribution between widely dispersed data sites is also typically slow due to the large distances the data, and any acknowledgements of the receipt of such data, must travel.

The above-mentioned drawbacks are compounded when large volumes of data, such as terabytes, are to be transferred between dispersed data sites.

Accordingly, a system and method for reliably distributing large amounts of data between widely dispersed data sites would be highly desirable.

SUMMARY

According to one embodiment, there is provided a method of distributing files over a network. The method operates in a system having a master and a plurality of slaves, interconnected by a communications network. Each slave determines a current file length for each of a plurality of files, the current file length of each respective file representing an amount of the respective file currently stored at the slave. Each slave sends slave status information to the master, the slave status information including the current file length for each of the plurality of files. The master schedules copy operations based on the slave status information received from the slaves. Each scheduled copy operation is for copying a specified portion of a specified file, from a first specified slave to a second specified slave of the plurality of slaves.

The master also stores bandwidth capability information indicating data transmission bandwidth capabilities for the resources required to transmit data between the slaves, and stores bandwidth usage information indicating amounts of data transmission bandwidth allocated to copy operations scheduled by the master. The stored bandwidth usage information indicates a total allocated bandwidth for each resource. While scheduling a copy operation, the master also allocates an amount of data transmission bandwidth with respect to each resource required by the copy operation, and updates the stored bandwidth usage information accordingly. The master only schedules copy operations that do not cause the total allocated bandwidth of any resource to exceed the bandwidth capability of that resource.

In some embodiments, some files are configured as a sequential set of blocks. A generator at one of the slaves generates blocks of a file after at least one block of the file has already been copied to another one of the slaves by the execution of a respective copy operation scheduled by the master. Thus, portions of a file are distributed among the slaves even before the generation of the file is completed. This overlaps data generations with data distribution, making efficient use of the system resources.

Accordingly, copy operations are scheduled so as to make the invention address the drawbacks of the prior art by providing a system and method for data distribution over a widely distributed network while limiting scheduled file transmissions in accordance with available bandwidth resources. In effect, data is distributed virally from a source where it was first generated. For example, data generated on a first machine in a first rack is first distributed to the other machines in its rack, then to the machines in its data center, then to the nearest datacenter, etc, so as to utilize the least resources. Accordingly, valuable resources, such as long distance circuits, are not continually and inefficiently utilized.

BRIEF DESCRIPTION OF THE DRAWINGS

For a better understanding of the nature and objects of the invention, reference should be made to the following detailed description, taken in conjunction with the accompanying drawings, in which:

FIG. 2B is a block diagram of a the file set file shown in FIG. 2A;

FIG. 2C is a block diagram of the slave state shown in FIG. 2A;

FIG. 2D is a schematic of a data file and a checksum file, according to an embodiment of the invention;

FIG. 3B is a block diagram of a system hierarchy table shown in FIG. 3A;

FIG. 3C is a block diagram of a system resources table shown in FIG. 3A

FIG. 3D is a block diagram of a pending transaction table shown in FIG. 3A;

FIG. 3E is a block diagram of a State table shown in FIG. 3A;

Like reference numerals refer to corresponding parts throughout the several views of the drawings.

DETAILED DESCRIPTION OF EMBODIMENTS

Figure 1:
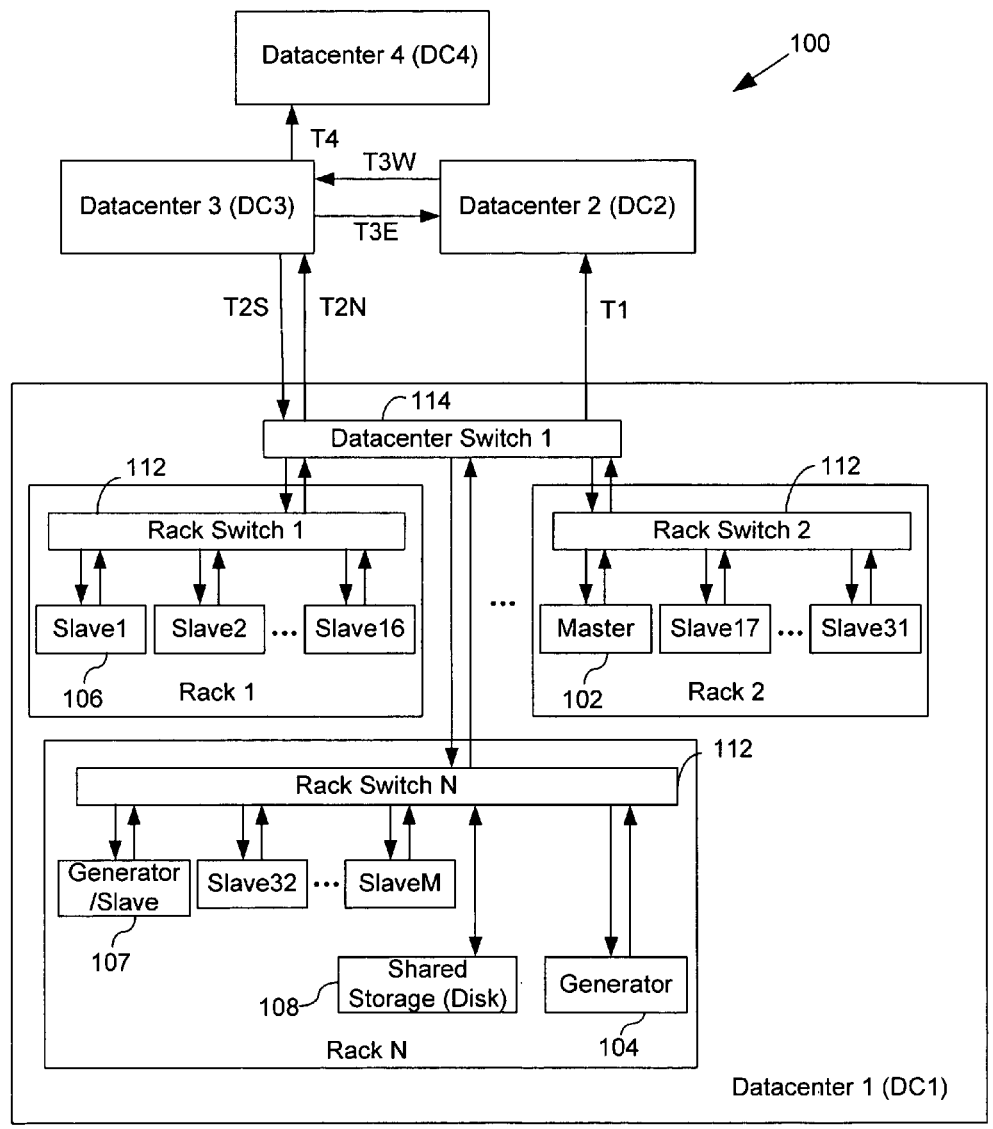
FIG. 1 is a block diagram of a data distribution network, according to an embodiment of the invention.

FIG. 1 is a block diagram of a data distribution network 100, according to an embodiment of the invention. It should be appreciated that the layout of this network 100 is merely exemplary and the network 100 may take on any other suitable layout or configuration. The network 100 is any suitable system for transmitting data between datacenters, and may include dedicated optical links or other dedicated communication channels, as well as supporting hardware such as modems, bridges, routers, switches, wireless antennas and towers, and the like. The network 100 preferably includes one or more wide area networks (WANs) as well as multiple local area networks (LANs). Furthermore, the network 100 is preferably a private network, i.e., the network is designed and operated exclusively for a particular customer, in which the customer leases circuits and sometimes switching capacity for the customer's exclusive use. Alternately, a public network with a fixed, known topology may be used.

The network 100 preferably includes multiple dispersed datacenters (DC1-DC4). Some of the datacenters may be located, geographically, close to each other, and others may be located far from the other datacenters. Furthermore, one of the datacenters may be the primary source of new files to be distributed to the other datacenters, or alternately, the generation of new files may be shared by two or more of the datacenters. Each datacenter (DC1-DC4) preferably includes multiple racks. For example, datacenter one (DC1) includes multiple racks (Rack 1-N). Physically, the racks may include frames or cabinets into which the slaves and other components, such as switches, are mounted. Each rack preferably includes multiple slaves. For example, the first rack (Rack 1) includes multiple slaves (Slave 1-16), the second rack (Rack 2) includes multiple slaves (Slave 17-31, and the third rack (Rack 3) includes multiple slaves (Slave 32M). The slaves can include any electronic or electromechanical unit of equipment, but in a preferred embodiment are computers. In other embodiments the slaves may include computer controlled devices, such as network attached storage devices.

At least one of the racks also includes one or more master(s) 102 and at least one the racks contains one or more generators 104. The generators generate the data that will ultimately be distributed throughout the network 100, while the master(s) schedule and control the data distribution throughout the network 100. In a preferred embodiment, some of the slaves may take on one or more roles, such as a generator 104, master 102, and/or slave 106. For example, in some embodiments, a slave and a generator are combined in a single device 107. In fact, many of the generators in a system may also function as slaves for purposes of the data distribution system. This dual functionality can be used to simplify the configuration and management of the system. Alternatively, or in addition, one or more separate generator(s) 104 may be provided. Also, a rack may include a shared storage or disk 108 that is shared by the one or more slaves and/or generators. In particular, in some embodiments, a generator stores the files it generates in a disk 108 that is shared with a slave. The slave has full access to the files written to the disk by the generator, and thus acts as a source of those files to the system.

In some embodiments, the generators 104, 107 produce new files and new versions of files in a way that enables distribution of portions of the files before generation of the files has been completed. This is important when the generation of a file may take hours, because the process of distributing copies of the file can be largely overlapped with the generation of the file. In these embodiments, when a generator is producing a file whose length is greater than a predefined block size (e.g., 16 MBytes), the generator produces a checksum associated with each successive block of the file, where each block (except possibly the last block) of the file has the predefined block size. Periodically, the slave associated with the generator 104/107 publishes to the master 102 status information indicating the new size of the file being generated. The master uses that size information to identify other slaves which need copies of the newly generated blocks of the file. As a result, in many instances copy operations for copying the blocks of the file are scheduled and executed before the generator generates the last block of the file.

In another aspect of the embodiments in which files are generated as blocks, the generator also produces a final flag or other indicator value when the last block of a file has been generated. In some embodiments, the final flag (or equivalent indicator value) is stored in combination with the checksum for the last block of the file. When that checksum value and final flag are conveyed to a requesting slave, and the block is successfully received, the requesting slave knows that the file is complete and therefore knows that the file may be used in the operations of the requesting slave.

In a preferred embodiment, all masters, generators, and slaves within each rack are interconnected to one another through a rack switch 112. For example, the Slaves 1-16 in Rack 1 are interconnected through the Rack Switch 1, while the master and the Slaves 17-31 are interconnected through the Rack Switch 2. In a preferred embodiment, each slave is coupled to its respective rack switch 112 through separate and distinct uplinks and downlinks, depicted in FIG. 1 by the up and down arrows coupling each slave to its respective rack switch. In a preferred embodiment, these uplinks and downlinks communicate unidirectionally. Furthermore, all racks within each datacenter are also preferably interconnected via a datacenter switch 114. For example, the Racks 1, 2, and 3 are interconnected through the Datacenter Switch 1. In a preferred embodiment, each rack is coupled to its respective datacenter switch through separate and distinct uplinks and downlinks, depicted in FIG. 1 by the up and down arrows coupling each rack to its respective datacenter switch. Again, in a preferred embodiment, these uplinks and downlinks communicate unidirectionally. In a preferred embodiment, the rack switches 112 and datacenter switches 114 are crosspoint switches, also known as a crossbar or N×N switches, which are switching devices that provide for a fixed number of inputs and outputs, where the inputs and outputs communicate at full speed with one another. In use, the bandwidth of each of the connections provided by the rack and datacenter switches is significantly higher than that along the trunks, as described below. Furthermore, the bandwidth of each connection provided by the rack switches and datacenter switches is greater than the input and output bandwidth of the slave devices. Accordingly, the rack and datacenter switches are preferably treated as allowing infinite bandwidth connections between slaves directly connected to them, because these switches are never the locus of a bandwidth limitation when scheduling data transfers between slave devices.

In a preferred embodiment, each datacenter (DC1-DC4) is preferably coupled to another datacenter along dedicated trunks (T2S, T2N, T1, T3W, T3E, and T4). In a preferred embodiment, these trunks communicate substantially unidirectionally. In particular, each trunk line may be asymmetric, providing a much larger bandwidth in one direction (the primary direction) than the other (the reverse direction). The reverse direction of each trunk is used primarily for TCP/IP control messages and the like, and can also be used for sending short messages such as slave status messages from slaves to the master. Some datacenters are coupled to one another through trunks in both directions, such as T2S and T2N, or T3W and T3E, while other datacenters are coupled to one another through a single unidirectional trunk, such as T1 or T4. The uplinks, downlinks, and trunks may include any suitable links, such as copper twisted pairs, coaxial cables, optical fibers, wireless connections, and the like.

In some embodiments, each of the slave, master and generator devices is also connected (via i/o ports 214, FIG. 2A) to at least one additional communication network, not shown in FIG. 1. This network may be a local area network, wide area network or a combination thereof. The slave devices communicate status information to the master 102 through this additional network, while file transfers are conveyed through the switched network shown in FIG. 1. In other embodiments, the additional network is only for sending status information to the master 102 from slaves in data centers that do not have a trunk line connection back to the data center in which the master 102 resides.

A goal of the system 100 shown in FIG. 1 is for the master to schedule data copy operations among the slaves so that newly generated files and newly generated portions of files are quickly and efficiently copied to all the slaves requiring copies of those files and file portions. The master takes into account bandwidth limitations of the various resources in the system when making scheduling decisions, so as to avoid overloading any system resource. File copy operations (herein also called file transfers) are only scheduled over resources having sufficient bandwidth to enable the file copy operation to be performed at full speed, where full speed may be defined as the maximum speed compatible with the operation of the sending and receiving slaves. Because long distance trunk lines are typically the most limited resources, the master will typically transfer each file or file portion over a trunk line just once. Once a copy of a file or file portion resides in any slave within a datacenter, all other slaves requiring a copy of the same file or file portion are typically scheduled to obtain their copies from one or more other slaves within that datacenter. As a result, the pattern of data file copying across the network has a viral quality, with data file generation being concentrated in one part of the system, initial file copies being sent over the trunk lines to the other data centers, followed by copying of the files within each of the datacenters. This methodology conserves trunk line resources. However, this methodology is flexible in that data copy operations are dynamically scheduled in accordance with the availability of bandwidth resources. Thus, if the only available route (or the best available route) for copying a file portion to a slave requiring that file portion includes transmission over a trunk line, then the file copying operation is scheduled over that route. Nevertheless, in most cases file copy operations within a datacenter will be favored over file copy operations over trunk lines.

In some embodiments, the master 102 selects file copy operations to schedule using one or more cost functions to determine the best file copy operation to schedule for each slave that does not have a complete set of files. In some of these embodiments, the master 102 is configured to apply a predefined cost function to a plurality of potential copy operations to produce a respective score for each potential copy operation. The master then selects and schedules the copy operation having a best score.

In one embodiment, file copy operations are selected using a multiple factor cost function. The factors in the cost function include: 1) the hierarchical distance between the source and target slaves (e.g., the number of rack and datacenter boundaries that the copy operation would have to cross); 2) the amount or percentage of a file which is needed by the requesting slave (e.g., a function of the file size in the requesting slave and the file size of the slave having the largest amount of the data for the file); 3) a factor that favors slaves (as the source of a file copy operation) that have the least amount of data (e.g., a function of the total of the file sizes reported by each slave that is a potential source of a next block of a file); 4) a factor that favors slaves having the fewest outstanding copy operations (e.g., a function of the number of copy operations listed in the pending transmission table 384 for each slave that is a potential source of a next block of a file); and 5) a factor favoring copy operations using the fewest trunk lines. All these factors are multiplied together to produce a final score. From among a set of potential copy operations for a slave, the operation having the best score is selected.

In another embodiment, the master uses two cost functions to select copy operations to schedule. One of the cost functions is used for global scheduling, discussed below, and the other cost function is used for local scheduling, also discussed below.

Figure 2A:
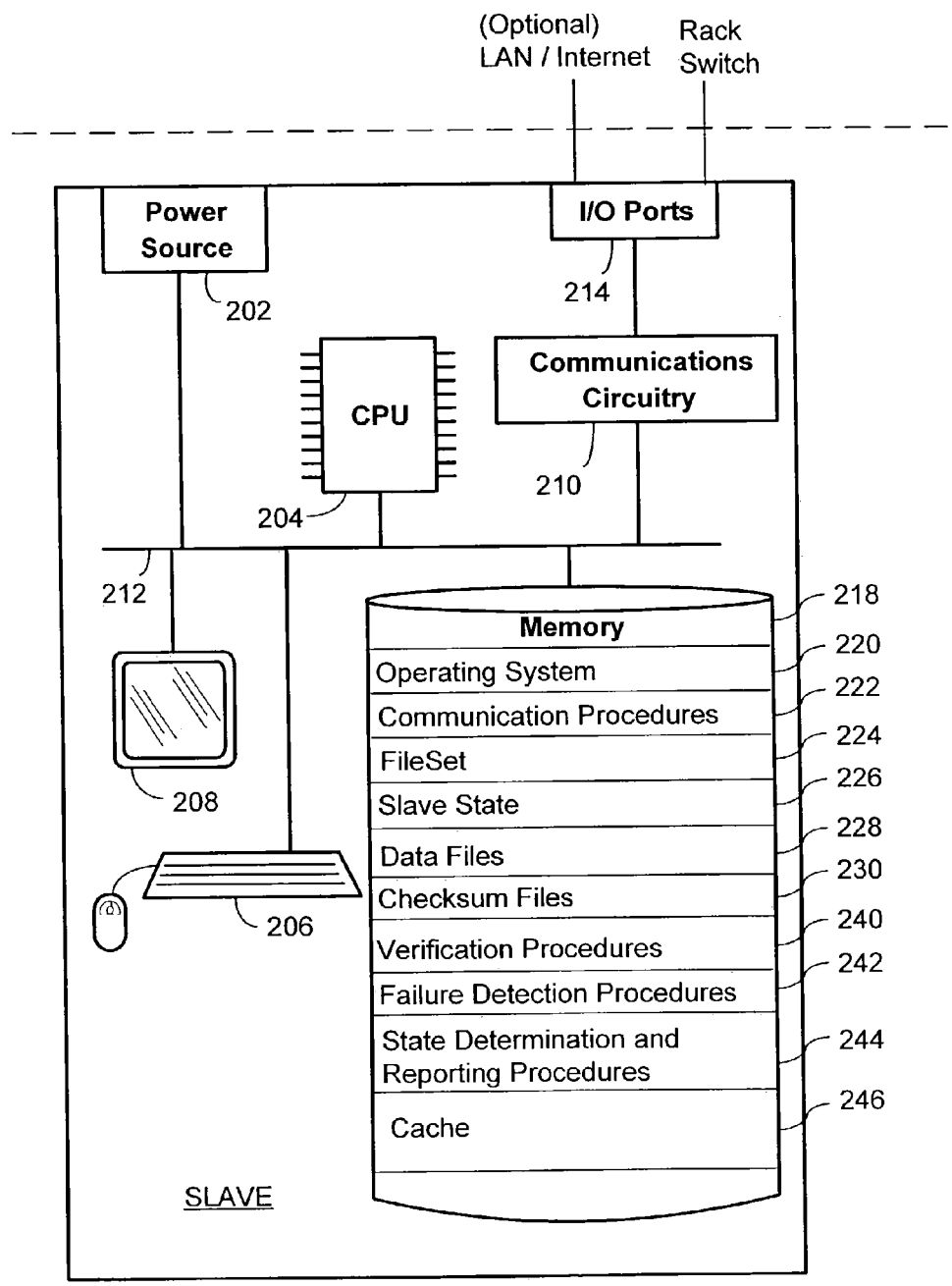
FIG. 2A is a block diagram of a slave shown in FIG. 1.

FIG. 2A is a block diagram of one of the slaves shown in FIG. 1. Each slave preferably includes: at least one data processor or central processing unit (CPU) 204; a memory 218; communications circuitry 210 for communicating with other devices in the network 100 (FIG. 1) via the rack and datacenter switches; input and output (I/O) ports 214 coupled to the communication circuitry 210, to a respective rack switch, and to a backplane or shared bus (not shown); a power source 202 configured to be coupled to a source of power; and at least one bus 212 that interconnects these components. Each slave may optionally include one or more user interface devices, such as a monitor 208 and a keyboard/mouse 206.

Memory 218 preferably includes high-speed random access memory and may include non-volatile memory, such as one or more magnetic disk storage devices. In some implementations, memory 218 may include mass storage that is remotely located from the central processing unit(s) 204, such as the shared storage 108 shown in FIG. 1. Memory 218 preferably stores an operating system 220, such as Linux, Unix or Windows (a trademark of Microsoft), that includes procedures for handling basic system services and for performing hardware dependent tasks. Memory 218, or alternatively one or more storage devices (e.g. one or more nonvolatile storage devices) within memory 218, includes a computer readable storage medium. Memory 218, or computer readable storage medium, also preferably stores communications procedures 222 used for communicating with other devices on the network 100 (FIG. 1), such as other slaves, the master, and/or the generator. In particular, the communication procedures 222 are used for transmitting the slave state to the master, receiving instructions from the master, requesting and/or receiving data from other slaves or the generator, as described below in relation to FIG. 4.

Memory 218 also preferably includes: a file set file (FileSet) 224; the slave state 226; data files 228; checksum files 230; verification procedures 240; failure detection procedures 242; state determination and reporting procedures 244; and a cache 246 for temporarily storing data. The file set file (FileSet) 224 contains a list of files required by the particular slave. In some embodiments, there are multiple distinct sets of slaves, each of which has a different set of files. For instance, if the system 100 (FIG. 1) is a search engine system, there may be anywhere from five to one hundred (or perhaps a few hundred) distinct types or classes of slaves, each of which performs a distinct function or set of functions in the process of responding to search engine queries. For instance, the index of documents to be searched may be divided over a small or large number of slaves, and therefore each of these slaves will have a distinct FileSet. Furthermore, one or more of the datacenters of the system may have more than one copy of each type of slave, thereby providing multiple replicas of the entire search engine so as to be able to service large numbers of search requests. Thus, if the system has slaves of types 1 through N, and a datacenter has M replicas of the search engine, where M is an integer greater than 1, there will be M slaves of each type in the data center. These slaves will preferably be spread over multiple racks so that no single rack failure will prevent the system from being able to respond to search queries.

FIG. 2B is a block diagram of an example of a file set file 224. The required files are listed by file identifier (FileID) and file version number (Version). Thus, each entry 225 in the FileSet 224 includes a file identifier and a file version number for one of the files that the slave needs in order to have a full and current set of files. In one embodiment, the FileSet 224 does not list itself as one of the required files, and the slave is originally deployed without a FileSet 224 stored in its memory. Instead, the Slave State of the slave is initialized to include an entry for the FileSet required by the slave, as will be explained in more detail below. In another embodiment the FileSet file does list itself as one of the required files. In a preferred embodiment, the slave is originally deployed without a FileSet 224 stored in its memory. Once the master instructs the slave to copy the FileSet 224 required for that slave, and the slave obtains and stores the FileSet, the status information reported by the slave enables the master to determine whether that slave has the latest version of that FileSet and schedule the file set file to be updated if necessary, as explained below in relation to FIG. 4.

Returning to FIG. 2A, the slave state 226 contains a list of all the files or portions of the files that have already been distributed to and stored by the slave as data files 228. FIG. 2C is a block diagram of the slave state 226 shown in FIG. 2A. The slave state 226 lists all the files required by the slave, as well as the version of each such file currently stored by the slave, as well as the current size of each such file. Each file is preferably listed by file identifier (FileID), version number (Version), and file size (File Size). Except for the FileSet file, the file identifier and version number are copied from the FileSet.

The data files 228 distributed include very large files. To make the transfer of the large files more manageable, and to avoid having to retransmit an entire file when a failure occurs midway through a file transfer, the data files are preferably segmented into blocks, as shown in FIG. 2D. In one embodiment each block has a size of 16 MB (Megabytes) or less. More specifically, large files are both generated and copied in blocks of 16 MB, until the last block of the file has been received, which has whatever size (of 16 MB or less) required to complete the file copy process. It should, however, be appreciated that the block sizes may be any suitable size and/or of different sizes, as determined in accordance with predefined criteria.

Accordingly, each slave preferably receives the files it requires as a sequence of blocks, until such time that each data file has been completely received. As noted above, the slave may receive one or more blocks of a file before the generator of the file has generated the last block of the file. The slave state of the slave indicates the amount of data for each file that has been successfully received and stored by the slave. As will be explained in more detail below, each block of the data file may be received from a different source (e.g., a different slave) than the other blocks of the file. While in practice many blocks of a file may be copied in sequence from one slave to another, as network loading conditions change, the source of the blocks being copied to a slave may be changed by the master. In fact, the resource allocation and scheduling procedures 394 (FIG. 3A) on the master select the source of each block to be copied by a slave in accordance with a predefined bandwidth resource allocation method that attempts to make efficient use of system resources, especially data transmission resources, herein sometimes called "bandwidth resources." In other words, the preferred schedule preferably contains one or more instructions for requesting and/or obtaining data, where the transmissions to request and obtain the data are directed so as to consume available system resources and avoid attempting to consume system resources that are already fully committed. Typically, the preferred schedule will instruct the receiving slave to obtain a block from a sending slave, which has the required block, that is physically closest to the receiving slave, because that will typically use the least system resources. Another constraint is that the sending slave have sufficient available bandwidth on its outgoing link to service the data transfer. This scheduling is described in further detail below.

Returning to FIG. 2A, the verification procedures 240 are used to verify the integrity of the data received by, or stored on, the slaves. In one embodiment, the verification procedures 228 include a procedure for comparing each received block with a received checksum file 230. In a preferred embodiment, each data file 228 has a corresponding checksum file 230, as shown in FIG. 2D. The checksum file 230 includes a checksum value for each block of the data file. In a preferred embodiment, each checksum is a cumulative checksum that is a function of (1) the data in the data file block corresponding to the checksum, and (2) the cumulative checksum for all the previous blocks of the file, if any. The checksum value may be a cyclic redundancy check (CRC) checksum, generated using a predefined polynomial function (e.g., the well-known 32-bit Ethernet CRC polynomial) or any other suitable checksum function.

For instance, to verify the integrity of Block 2 of a file, the receiving slave device computes a checksum for the received block, using a predefined checksum function that is initialized with the cumulative checksum for the prior blocks of the file (in this case Block 1). If the computed checksum matches the checksum in the checksum file 230 for Block 2, then the transmission of Block 2 was successful and the receiving slave can rely upon that data. The slave reports the successful block transfer to the master. If the computed checksum does not match the checksum in the checksum file 230 for Block 2, then the transmission of Block 2 failed, and the receiving slave will report the failure to the master.

As each block of a data file 228 is received by a slave, the corresponding checksum value must also be conveyed to the slave. In some embodiments, the checksum is conveyed in a header portion of the transmission of the data file block. The slave is configured to retrieve the checksum from the header, compare the received checksum value with the one computed for the received block, and if the comparison indicates a successful data transfer, store the checksum in the respective checksum file. In another embodiment, a new copy of the checksum file 230 is transmitted by the sending slave to the receiving slave each time a block is transmitted to the receiving slave. The new copy of the checksum file includes the checksum corresponding to the block being transmitted to the receiving slave. Since the checksum file is generally very small (e.g., less than 4 KB, and usually much smaller), even for very large data files, transmitting the checksum file does not significantly affect the performance of the system.

In this way, the verification procedures 240 (FIG. 2A), described below, only calculate the integrity of the block received with respect to the checksum of the previous block received, without having to recalculate the integrity of all the blocks received for a particular data file. It should, however, be appreciated that any suitable checksum(s) and/or verification procedures may be used to verify the integrity of the blocks received.

The verification procedures 240 may also be used to verify the integrity of a block when read from disk storage to ensure that the block has been successfully read. In one embodiment, blocks are verified both by the sending slave when it reads the block from disk storage, or other memory device, and by the receiving slave when receiving the block.

The failure detection procedures 242 are generally used to detect failure of a data transfer. In particular, these failure detection procedures 242 are preferably configured to assess the cause and/or source of the failure. For example, where a data transfer between slaves fails, the failure detection procedures 242 attempt to identify the source of the failure, such as the slave, switch, or trunk responsible for the failure.

The state determination and reporting procedures 244 are used to determine the slave state 226, and to then report the slave state to the master. These procedures 244 may include one or more incremental state update procedures, for updating the slave state 226 as blocks are received, verified, and stored to disk. These procedures 244 may also include one or more procedures for comparing the data files 228 received and stored, with the data required, i.e., from the FileSet 224. For instance, when the FileSet 224 indicates a different file version than what is stored in a slave, the state determination procedures 244 update the slave state 226 to indicate the new file version and to indicate that zero bytes of that file are stored by the slave. When the slave state has been updated, it is sent by the procedures 244 to the master. The slave state is also sent to the master each time the slave reports to the master the completion of a file block transmission.

Figure 3A:
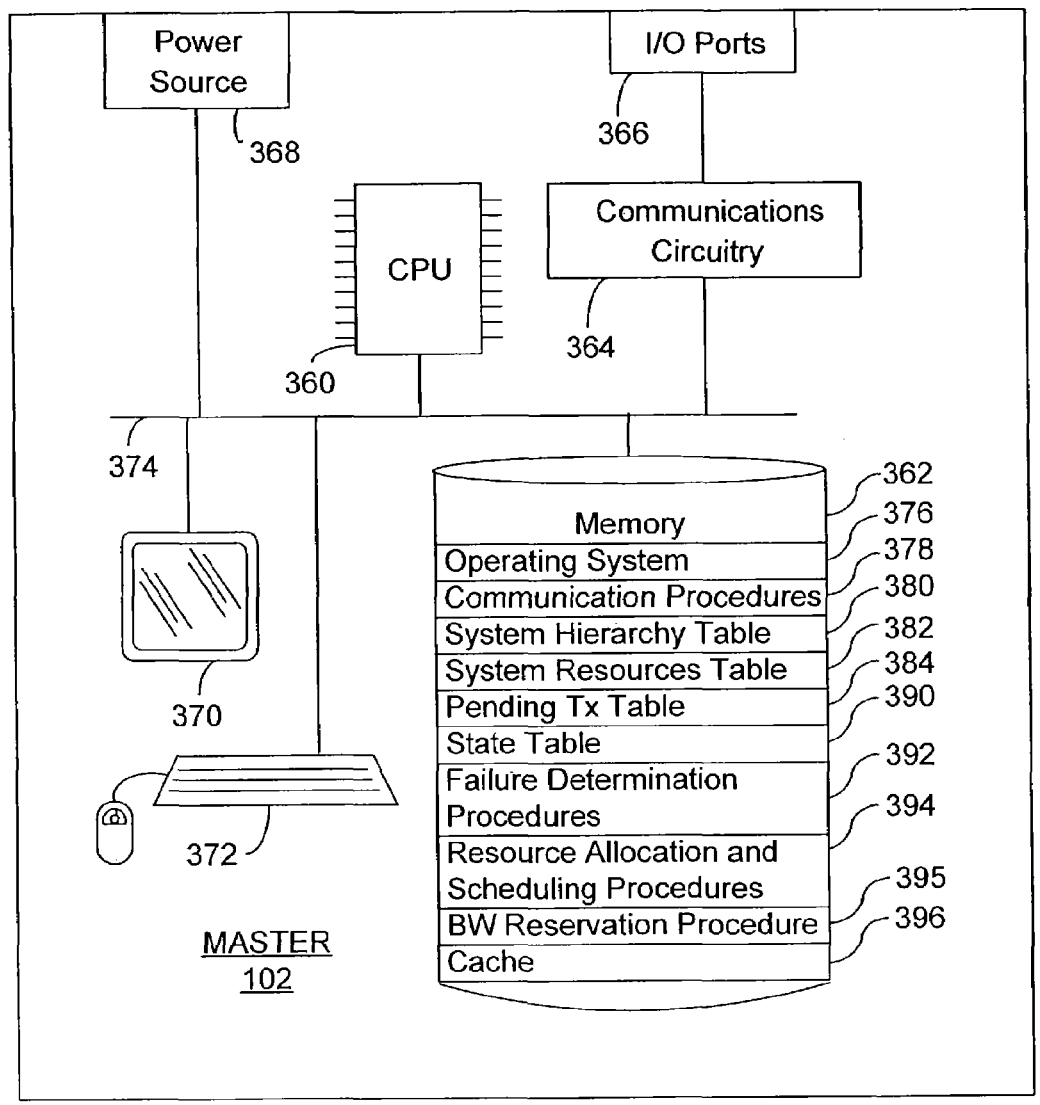
FIG. 3A is a block diagram of the master shown in FIG. 1.

FIG. 3A is a block diagram of the master 102 shown in FIG. 1. The master preferably includes: at least one data processor or central processing unit (CPU) 360; a memory 362; communications circuitry 364 for communicating with the slaves through one or more local area networks, a wide area network (e.g., the Internet), or a combination thereof; input and output (I/O) ports 366 coupled to the communication circuitry 364; a power source 368 configured to be coupled to a source of power; and at least one bus 374 that interconnects these components. In the embodiment shown, the master 102 communicates with the slaves through a rack switch (see FIG. 1). In other embodiments, it could communicate with the slaves through another network. Each master may optionally include one or more user interface devices, such as a monitor 370 and keyboard/mouse 372. For explanatory purposes, we will explain the operation of the embodiments in term of the operation of one master. However, multiple masters may be used in other embodiments.

Memory 362 preferably includes an operating system (OS) 376, such as Linux, Unix or Windows (a trademark of Microsoft) that includes procedures for handling basic system services and for performing hardware dependent tasks. Memory 362, or alternatively one or more storage devices (e.g. one or more nonvolatile storage devices) within memory 362, includes a computer readable storage medium. Memory 362, or computer readable storage medium, also preferably includes communications procedures 378 that are generally used for communicating with the network 100 (FIG. 1) and slaves. In particular, the communication procedures 378 are used for receiving a slave's state and for transmitting instructions to slaves, as described below in relation to FIG. 4.

Memory 362 also preferably includes a system hierarchy table 380, a system resources table 382, a pending transmissions table 384, a state table 390, failure determination procedures 392, resource allocation and scheduling procedures 394, and a cache 396. The system hierarchy table 380 is used by the master to determine the proximity of slaves to one another. The system resources table 382 is used by the master to determine the bandwidth resources for each communication path in the switched network, and the resources currently in use or reserved for use. The pending transmissions table 384 is used to keep track of all current or pending transmissions. The state table 390 is used by the master to determine which system resources have failed, as well as which files or blocks of files have been received by each slave and while files or file blocks are still needed by each slave. The failure determination procedures 392 are used by the master for determining whether a resource has failed. The resource allocation and scheduling procedures 394 are used to schedule data transfers between slaves, as described in further detail below in relation to FIGS. 4 and 5A-5D. The cache 396 is used for temporarily storing data.

A more detailed block diagram of the system hierarchy table 380 is shown in FIG. 3B. The system hierarchy table 380 contains a slave level graph 386 and a rack level graph 388. The slave level graph 386 lists all slaves in the network 100 (FIG. 1) by slave identifier (Slave ID). The slave level graph also lists a corresponding slave location (Slave Location) for each slave. For example, Slave 134 is located in rack R35. From another viewpoint, the slave level graph identifies the parent of each slave in the system hierarchy, where each slave's parent is an identified rack.

Similarly, the rack level graph 388 lists all racks in the network 100 (FIG. 1) by rack identifier (Rack ID). The rack level graph also lists a corresponding rack location (Rack Location) 393 for each rack. For example, rack 35 (Rack 35) is located in datacenter 2 (DC2). This system hierarchy table 380 allows the master to determine the relative locations and/or distances between slaves and/or racks, and thereby increase distribution efficiency by transferring data between slaves that are physically close to one another.

FIG. 3C is a block diagram of the system resources table 382 shown in FIG. 3A. The system resources table 382 includes multiple graphs, including a slave level bandwidth graph 321, a rack level bandwidth graph 325, a datacenter level bandwidth graph 327, and a trunk level bandwidth graph 328. Each of these graphs lists the maximum available bandwidth resources and the bandwidth currently being used, or reserved for use, for each slave, rack, datacenter, and trunk.

The embodiments described here enable the system to account for bandwidth used for tasks other than conveying file blocks. In particular, in some embodiments, the master is configured to include a bandwidth reservation procedure 395 for receiving bandwidth reservations and bandwidth relinquishments from applications that make use of the same communication paths as the communication paths used for conveying copies of file blocks (i.e., for file replication). For instance, if an application running somewhere in the system will require up to 10 units (e.g., MB/Sec) of bandwidth for several minutes, over a specified path through the network, it sends a corresponding bandwidth reservation to the reservation procedure 395 of the master. The master stores the bandwidth reservation information in its system resources table 382 and its pending transmissions table 384, as described below. The application may optionally specify a termination time at which the reservation is to expire. When the application no longer requires the use of the network it sends a corresponding bandwidth relinquishment to the master, which then releases the corresponding resources by revising the entries in its system resources table 382 and pending transmission table 384. Alternately, the tables are updated at or after the specified termination time. An advantage of this methodology is that the system does not need to permanently reserve a predefined portion of the bandwidth of its communication paths for processes other than file replication. Such permanent reservations would decrease the throughput of the system, by artificially limiting the number of file copy operations that can be scheduled for each unit of time. Instead, these embodiments reduce the bandwidth available for file replication operations only when other applications notify the master that they require the use of a portion of the bandwidth of specified communication paths through the network. In other embodiments, the master is not configured to receive bandwidth reservations and bandwidth relinquishments from such other applications, and therefore the "available bandwidth" values stored in the system resources table 382 (as described below) are adjusted values less than the actual full bandwidths of the various communication paths in the network so as to take into account the fact that other applications share the use of those communication paths.

The slave level bandwidth graph 321, lists the bandwidth resources for each slave. The record for each slave, identified by its slave identifier (Slave ID), includes fields specifying the maximum available inbound bandwidth (Inbound BW) and maximum available outbound bandwidth (Outbound BW) for that slave. For example, Slave 160 has a maximum inbound bandwidth (Inbound BW) of 100 MB/sec and a maximum outbound bandwidth (Outbound BW) of 100 MB/sec. The record for each slave also includes fields specifying the inbound bandwidth currently being used or reserved for use (In BW in use), and the outbound bandwidth currently being used or reserved for use (Out BW in use), is also listed for each slave. For example, for Slave 160, 10 MB/sec of the available inbound 110 MBs bandwidth is being used, or reserved for use, and none of the available outbound 100 Mb/sec bandwidth is being used, or reserved for future use. The maximum available inbound bandwidth (Inbound BW), maximum available outbound bandwidth (Outbound BW), inbound bandwidth currently being used or reserved for use (In BW in use), and the outbound bandwidth currently being used or reserved for use (Out BW in use), is also listed for each rack and datacenter in the rack and datacenter level bandwidth graphs 325 and 327, respectively. These values are listed by rack identifier (Rack ID) or datacenter identifier (Datacenter ID), respectively.

The trunk level bandwidth graph 328 lists, for each respective trunk line, a trunk identifier (Trunk ID), the maximum available bandwidth (BW); the bandwidth currently in use or reserved for use (BW in use); the starting point of the trunk (Start); the end point of the trunk (End); and the latency along that trunk (Latency). The start and end points identify the direction of data travel over each respective trunk, as each trunk is preferably configured for unidirectional communication. The latency is the delay between the time that a packet is transmitted and the time that it is received. For example, for the trunk T4 between datacenters 2 (DC2) and 3 (DC3) the maximum available bandwidth is 30 MBs, 20 MBs are in use, or reserved for use, and the latency along the trunk is 35 ms. The latency is used to calculate the optimal or preferred window size, as described below.

FIG. 3D is a block diagram of the pending transmissions table 384 shown in FIG. 3A. The pending transmissions table 384 lists all current data distribution transmissions, as well as any bandwidth reservations, within the network 100 (FIG. 1). Each entry in the table includes fields for identifying: the slave from which the data is being copied (Copy From); the slave to which the data is being copied (Copy To); the amount of bandwidth used by the transmission or reservation (BW used); a termination time by which the transmission is expected to have completed (End Time); and a reserve flag (Reserve Flag) indicating whether the entry represents a bandwidth reservation (as opposed to a file replication operation). The End Time (or termination time) for each transmission is preferably significantly later than the expected completion time (e.g., a transmission expected to take 2 seconds may be assigned an End Time that is 6 to 10 seconds after the start of the transmission), and is used primarily for cleaning up failed transmissions.

An exemplary entry in FIG. 3D shows that Slave 34 is currently copying data to slave 35; is using 10 MB/sec of bandwidth; and is expected to complete the operation no later than 8:22. Another exemplary entry in FIG. 3D shows that an application has reserved 10 MB/sec of the bandwidth in the path from Slave 89 to Slave 191 until 9:25. The End Time for a transmission is preferably the estimated time that the transmission will terminate. If a transmission completes prior to the End Time specified in the pending transmission table 384, which will generally be the case for a successful transmission, the master will delete the transmission entry from the pending transmission table 384 when it receives a message from the receiving slave indicating that the file block transmission was successfully completed. Alternatively, the master will delete the transmission entry from the tending transmission table at or shortly after the specified transmission expiry time. Each time that the master deletes a transmission entry from the pending transmissions table 384, the corresponding bandwidth use entry or entries in the system resources table are decreased by the amount of bandwidth denoted in the transmission table entry.

In an alternate embodiment, the "bandwidth in use" amount of each resource having a non-zero "bandwidth in use" is automatically decreased at the end of each period (e.g., each successive 2 second period) by either a predefined amount, such as the greater of 10 Bytes/sec and fifty percent of the "bandwidth in use", or by a fixed amount, or by a function of the available bandwidth (e.g., 10% of the available bandwidth). In embodiments using this methodology, no adjustment is made to the bandwidth in use values when each file block transmission completes. This alternate implementation is particularly useful when most copy operations are expected to take a relatively fixed, short amount of time. For instance, in embodiments where copy operations not involving trunk lines move file blocks of 16 MBytes at a rate of 10 MBytes/sec, the large majority of copy operations will be completed within two seconds of their start time. Therefore, periodically automatically decreasing the bandwidth in use by a predefined amount is unlikely to result in over-allocation of bandwidth resources.

In some embodiments, a single entry in the pending transmissions table 384 can specify bandwidth used over several communication channels. For instance, a transmission table entry for a transmission between two slaves (slave A and slave B) on different racks (rack 1 and rack 2) of a datacenter will correspond to four bandwidth usage entries in the system resources table: slave A (Out BW in use), rack 1 (Out BW in use), rack 2 (In BW in use) and slave B (In BW in use). Each of these four bandwidth usage entries in the system resources table will be increased by the amount of bandwidth specified in the transmission table entry, and this same amount will be subtracted from those bandwidth usage entries when the transmission terminates. If the two slaves were in different data centers, then there would also be corresponding changes made to the bandwidth usage entries for the two datacenters, as well as for any intervening datacenters and trunk lines. For example, a transmission from a slave in Datacenter DC1 to a slave in Datacenter DC4 would also use bandwidth resources in Datacenter DC3 or DC2, as well as trunks T1 and T4 or T2N and T4.

FIG. 3E is a block diagram of the state table 390 shown in FIG. 3A. The state table lists all resources in the network 100 (FIG. 1) by resource identifier (Resource ID). Resources include all trunks (T1-TJ), datacenters (DC1-DCK), racks (Rack 123-Rack N), and slaves (Slave 1-Slave M). Each resource has an associated state (State) that indicates whether that resource is functioning or not. For example, trunk 1 (T1) is functioning, while the second slave (Slave 2) is not, where a one (1) indicates that the resource is functioning and a zero (0) indicates that the resource is not functioning.

In addition, each resource has an associated transmission attempts count (Attempts), as well as a failure count (Failure Count) that can be incremented or decremented by the failure determination procedures 392 (FIG. 3A). In use, the failure determination procedures 392 (FIG. 3A) are used to determine if a particular resource is likely to have failed. Each time a copy operation is attempted, the corresponding Attempts Count for each device or resource involved in the data transfer is incremented. Each time a copy operation fails, the Failure Count is incremented for each resource that is potentially responsible for the failure. In some embodiments, the master receives an indication from the receiving slave indicating which resource(s) are believed to be responsible for the failure. The failure determination procedures 392 (FIG. 3A) then increment the failure count (Failure Count) for those resources. For instance, the slave requesting a copy of a file block may determine that the failure was due to insufficient disk space in the requesting slave, or that it was unable to read the received file block from its own storage, in which case the slave's message will indicate that the failure occurred in the requesting slave. In one embodiment, if the requesting slave is unable to determine that a failure occurred in the requesting slave, then the presumption will be that the failure occurred elsewhere, in which case the Failure Count for all other resources involved in the copy operation will be incremented.

When the count reaches a predetermined upper threshold or limit, that resource is identified as a failed or bad device. For example, when the failure count of the second slave (Slave 2) reached a predefined failure threshold (e.g., 50), the state (State) of the second slave was changed from a one (1) to a zero (0), thereby indicating that the second slave (Slave 2) has failed. In addition, the failure count (Failure Count) and the Attempts count (Attempts) preferably have a half-life, such that the failure count and attempts count degrade over time. In some embodiments, every attempts count and every failure count value in the state table is decreased by a predefined amount at scheduled times. For instance, at the end of each time unit (e.g., 2 minutes), each non-zero Attempts Count and each non-zero Failure Count is decreased by 10 percent, rounded down to the next closest integer. In another example, at the end of each time unit (e.g., 1 minute), each non-zero Failure Count is decreased by a fixed amount (e.g., 1), and each non-zero Attempts Count is decreased by another fixed amount (e.g., 5). If a device is reported to have suffered several failures, its Failure Count is increased with each report. If the device then recovers or is repaired, and no additional failures are reported for the device, the system will periodically decrease the Failure Count for the device. When the Failure Count falls below the predefined recovery threshold (e.g., 25), the state of the device is changed to "functioning" (denoted by a "1" in the exemplary table of FIG. 3E) and the master resumes scheduling file transfers in which the device is a participant. The predefined failure and recovery thresholds are preferably defined so as to provide a period of time for failed devices to perform a reset or recovery operation, or for the device to be serviced or replaced by a technician.

In some embodiments, the predefined failure and recovery thresholds are a function of both the Failure Count and the Attempts Count for each resource. By factoring in the Attempts Count as well as the Failure Count, resources with much larger numbers of successful copy operations than failed operations are kept in service. As shown in FIG. 3E, for each slave the status table also records the last time the master received a communication from the slave (Last Contact). In some embodiments, the termination of whether the state of a slave device is alive ("functioning") or dead ("not functioning") takes into account the difference between the current system time and the Last Contact time denoted for the slave. In particular, in these embodiments the slaves are configured to periodically send a status message to the master (e.g., twice per minute), in addition to sending a message each time a copy operation completes or fails. If the difference between the current system time and the Last Contact time is substantially longer than the amount of time between periodic slave status reports, then this is further evidence that a slave device's state should be denoted as "not functioning".

Furthermore, each entry for a slave listed in the state table 390 also includes state pointers (State Pointers). Each state pointer points to a copy of the slave state sent by the respective slave. The copy of the slave state includes a list of all the files required by the respective slave, the version of each such required file, and the current size of that file in the slave device. Each slave reports is slave state to the master both periodically and whenever a transmission to the slave is completed. The reported slave state is stored in the master's main memory at a location denoted by the corresponding State Pointer in the state table 392. For example, the state pointer for slave 3 (Slave 3) points to the master's copy of the slave state for Slave3-R2-DC1. Accordingly, the state table 392 in the master provides the master with a record of all files blocks that have already received by each slave.

In some embodiments, the state table includes a pointer 600 for each slave that points to a list 602 of slaves that store, or are configured to store, the same set of files. If there are N different types of slaves in the system, each configured to store a different set of files, then there will be N different lists 602 of slaves. In some embodiments, for each file listed in the slave state, the state information includes an Attempts count, a Failure Count and a State, each of which serves the same purpose as for other resources in the system. The meaning of these fields is described above. The state information for each listed file for a particular slave may optionally include a "Want Newest" flag, for indicating that the slave should be sent the latest version of the marked file, even if the slave's state did not indicate that it has requested that file. When the "Want Newest" flag is marked or set for a file, the master checks the list 602 of slaves configured to store the same files to determine if any store a newer version of the file than the version stored by the slave in question. When a newer version is found, the master attempts to schedule a copy operation for sending the slave the first block of the newer version of that file. For instance, in some embodiments the FileSet file is always marked with a "Want Newest" flag, thereby ensuring that each slave receives the current version of its FileSet file. The new version of the FileSet file may list new versions of other files that the slave needs to copy.

Figure 4:
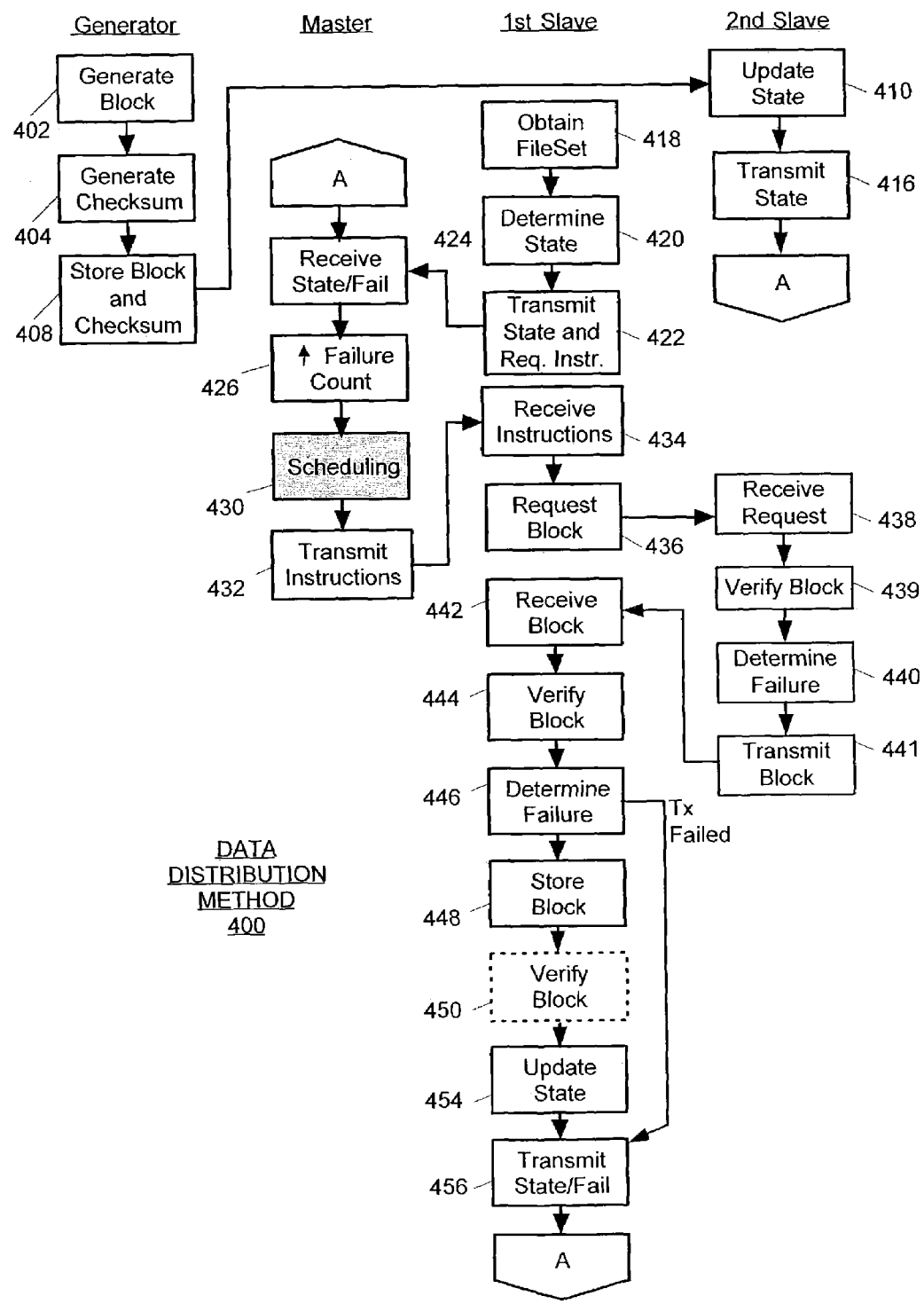
FIG. 4 is a flow chart of a method for distributing data.

FIG. 4 is a flow chart of a data distribution method 400, according to an embodiment of the invention. The method 400 describes a method whereby a single master (Master) (FIG. 1) controls the distribution of files between a first slave (1st Slave) and a second slave (2nd Slave). It should, however, be appreciated a master may control the distribution of any type of data between any number of slaves. It should also be appreciated that the first slave and the second slave may be any of the slaves in the network 100 (FIG. 1).

A generator 104 (FIG. 1) or a generator/slave 106 (FIG. 1) initially generates a block of a file, at step 402. For example, the generator or generator/slave generates a 16 MB block of a file. The generator preferably also generates a checksum of the block at step 404. Although not shown, the generator may also encrypt the block using digital signatures or the like. The block and checksum are then stored at step 408. In one embodiment, the block and checksum are stored by the generator 104 (FIG. 1) in the shared storage 108 (FIG. 1), which can be accessed by one or more of the slaves in the generator's rack (Rack N). Alternatively, the generator/slave stores the block and checksum in a common internal memory. The block and checksum are preferably stored in a data file 228 and a checksum file 230 in the memory of a slave device (FIG. 2A), herein identified as the second slave (2nd Slave), which has direct access to the memory in which the block is stored.

The state determination procedures 244 (FIG. 2A) on the second slave then updates the second slave's slave state (Slave State 226) (FIG. 2A) at step 410. The slave state is transmitted to the master either as soon as a new block is added, or periodically, or both, at step 416.

Each slave stores a file set file (FileSet) 224 (FIGS. 2A and 2B), containing a list of files that it must obtain and store. This file is periodically replaced with new versions as the versions of the files listed in the FileSet are updated. At step 418, the first slave receives either an initial FileSet or replacement FileSet. The process for receiving the FileSet file is actually the same as for any other data file, and thus follows the methodology shown in FIG. 4. Thus, step 418 is a conceptual representation of the process by which the first slave receives the current version of its FileSet. The state determination procedures 242 (FIG. 2A) on the first slave determine the slave state 226 (FIGS. 2A and 2C) of the first slave at step 420. To do this, the state determination procedures 242 (FIG. 2A) determine what blocks have already been received for each file listed in the FileSet. The information in the slave state is described above.

The slave state of the first slave is transmitted to the master at step 422. In some embodiments, the slave transmits the slave state periodically, as well as each time a file block transfer completes, whether successfully or in failure. The slave state is received by the master at step 424. The resource allocation and scheduling procedures 394 (FIG. 3A) subsequently schedule a data transfer of the aforementioned block from the second slave block to the first slave at step 430, in accordance with a predefined bandwidth resource allocation method. This scheduling is described in further detail below in relation to FIGS. 5A-5D. Based on this scheduling, the master transmits instructions to the first slave, at step 432, instructing the first slave (1st Slave) to obtain the block from the second slave (2nd Slave). These instructions are received by the first slave, at step 434, which then requests the block from the second slave in accordance with the instructions at step 436. The second slave receives the request for the block at step 438, and locates the block, and its associated checksum. Optionally, in some embodiments the second slave verifies the requested block using its verification procedures, at step 439. The failure detection procedures 242 (FIG. 2A) on the second slave preferably determine whether the block has been successfully read from storage, at step 440. If the requested block is verified, the second slave transmits the request block and its associated checksum to the first slave at step 441.

The block and its checksum are received by the first slave at step 442. The verification procedures 240 (FIG. 2A) then preferably verify the integrity of the received block using the received checksum at step 444. As described above, the verification procedures preferably use a cumulative checksum. The failure detection procedures 242 (FIG. 2A) then determine, at step 446, whether the block was received and whether the block was verified. In some embodiments, if a failure occurred, the failure detection procedures 242 (FIG. 2A) determine which resource was most likely to be responsible for the failure. For instance, if the block was not received, the failure detection procedures may specify that an unknown resource other than the receiving slave is likely to be responsible for the failure.

If the block transfer succeeded, the block is then stored in the first slave's memory in the appropriate data file, and the checksum for the block is added to the corresponding checksum file (step 448). If required, the block may be verified at any time thereafter by the verification procedures at step 450. The slave state of the first slave is then updated by the state determination procedures 244 (FIG. 2A) at step 454. In particular, if the block transfer was successful, the size of the data file for which the block was received is updated. If the block transfer failed, the slave state must not be updated, because none of the files denoted in the slave state have increased in size. The slave state and any failure data is subsequently transmitted to the master at step 456.

The slave state and/or any failure data is received by the master at step 424. If a failure occurred, as evidenced from the failure data, the failure determination procedures 392 (FIG. 3A) on the master increment the failure count (Failure Count) (FIG. 3E) for the resource blamed with the failure at step 426. In an alternate embodiment, when a block transfer fails, the master increments the failure count of every resource involved in the block transfer, since the source of the failure is unknown. When the failure count for the blamed resource reaches a predetermined limit, that resource is identified as failed or bad. As the failure count is automatically reduced at predefined intervals, the failure count decreases over time and the resource may again be determined to be good and allowed to re-enter service. Steps 420-432 are repeated until all the required blocks have been received. However, the identity of the first and second slaves may differ with each repetition of this process.

Using the methodology of this data distribution method, many pairs of slaves will perform copying operations simultaneously. In particular, all the slaves in the system will send status information and requests for instructions to the master, and all the slaves that have less than a complete set of files will receive instructions from the master to perform copy operations. While some copy operations may be delayed by the master due to bandwidth resource limitations, many simultaneous or overlapping copy operations will be executed in a typical implementation of the data distribution method. It should also be appreciated that the above described method may be used to distribute any type of file to the slaves, including sending new or updated file set files (FileSet) to the slaves.

In an alternate embodiment, the master instructions specified slaves to send data (i.e., file blocks) to other specified slaves, instead of instructing specified slaves to copy file blocks from other specified slaves. In the context of the present invention, the use of a push methodology is substantially equivalent to the use of the pull methodology (for copying file blocks) described above. In this alternate embodiment, a slave receives instructions from the master indicating a specified file block to transmit to a specified target slave. The target slave, upon receiving the transmission, verifies the received file block, stores the file block if verified, and sends a confirmation or error message, depending on the outcome of the verification, to either the master, the sending slave, or both.

Figure 5A:
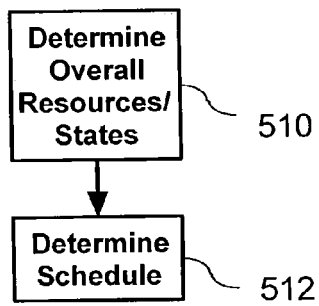
FIGS. 5A-5D are flow charts of different types of scheduling shown in FIG. 4, according to different embodiments.

FIGS. 5A-5D are flow charts of different types of scheduling that can be used to implement the schedule step 430 of FIG. 4. FIG. 5A shows local scheduling 500. In local scheduling 500, once the master has received the first slave's state at step 424 (FIG. 4), the resource allocation and scheduling procedures 394 (FIG. 3A) in the master's memory, determine: the overall system hierarchy from the system hierarchy table 380 (FIGS. 3A and 3B); the overall system resources from the system resources table 382 (FIGS. 3A and 3C) for all resources in the network; all pending transmissions in the network from the pending transmissions table 384 (FIGS. 3A and 3D); and the overall states of all resources in the network from the state table 390 (FIGS. 3A and 3E). Based on the overall system hierarchy, the overall system resources, all pending transmissions, the overall the states of all resources, and the first slave's state, the resource allocation and scheduling procedures 394 (FIG. 3A) then determine a preferred schedule for transferring a block to the first slave, at step 512. For example, the first slave may require file 0001v1 block 5. The scheduling procedures examine the states of all the slaves configured to store the specified file (as identified by the list 602 of such slave, FIG. 3E) to determine a set of candidate slaves, to assess what resources would be required to transmit the required block from each of the candidate slaves to the first slave, and also assesses whether those resources are available for allocation. For each candidate slave where the required resources for a file copy operation are available, a cost function is evaluated to produce a score. The copy operation may then be scheduled from the candidate slave having the best score to the first slave.

In some embodiments, the cost function evaluation is applied, with respect to a requesting slave, to every file listed in the requesting slave's status where at least one other slave has a longer copy of the file (i.e., has at least one more block of the file than the requesting slave). In other words, for a requesting slave, the master identifies every file in the slave's status that is a candidate for a copy operation because there is another slave with more data for that file. For each such file, the master identifies a set of candidate slaves, identifies the required resources that would be needed to make a copy of each such slave, checks whether the required resources are available, and if so, calculates a cost function score. The master selects the copy operation, for copying a block of a file F from a slave S, having the best score. If the master is using local scheduling, the master sends the requesting slave instructions to execute the selected copy operation.

Alternately, the scheduling procedures may cut short these determinations if there is at least one candidate slave in the same datacenter as the first slave, and if the resources required to transmit the required block from that slave to the first slave are available for allocation. The scheduling procedures then select as the source of the file block transmission a best candidate slave, where the "best slave" is determined in accordance with a predefined cost function. If the second slave has file 0001v1 block 5, and transmission of the file block from the second slave to the first slave has the best cost function score compared to the other candidate slaves, the second slave is selected as the source slave. Once the source slave is selected, the master schedules the transfer by sending file block copying instructions to the receiving slave device, and by updating the system resources table and pending transmissions table to denote the scheduled file block transmission.

Figure 5B:
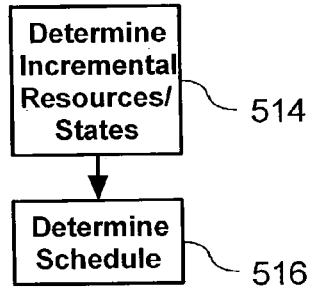

FIG. 5B shows incremental scheduling 502. Here, the resource allocation and scheduling procedures 394 (FIG. 3A) in the master's memory, determine the incremental system resources and incremental states at step 514. In incremental scheduling 502, once the master has received the first slave's state at step 424 (FIG. 4), the resource allocation and scheduling procedures 394 (FIG. 3A) determine: the system hierarchy from the system hierarchy table 380 (FIGS. 3A and 3B); the system resources that have changed since the last time that the master performed scheduling, from the system resources table 382 (FIGS. 3A and 3C); all pending transmissions in the network that have changed since the last time that the master performed scheduling, from the pending transmissions table 384 (FIGS. 3A and 3D); and the states of all resources in the network that have changed since the last time that the master performed scheduling, from the state table 390 (FIGS. 3A and 3E). In other words, the resource allocation and scheduling procedures 394 (FIG. 3A) only look at changes to the system resources since the last scheduling occurred. Based on the above, the resource allocation and scheduling procedures 394 (FIG. 3A) determine a preferred schedule for transferring a block to the first slave, at step 516. In other words, the scheduler assumes that the network has remained the same except for changes the master made when last performing scheduling. Less work is performed by the master as the overall states and resources are not examined each time scheduling occurs. When using incremental scheduling, the master will often schedule successive file block transmissions for a particular file between the same two slaves until either all the blocks of the file in the sending slave have been transmitted, or another transaction uses the resources required to transmit a file block from a first one of these two slaves to the second.

Figure 5C:
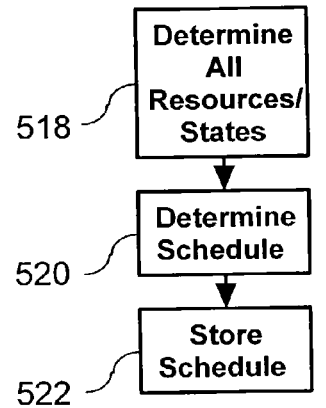

FIG. 5C shows global scheduling 504. Here, periodically, or whenever the master is not performing any other tasks, i.e., when otherwise idle, the resource allocation and scheduling procedures 394 (FIG. 3A) determine the overall system hierarchy, the overall system resources, all pending transmissions, and the overall states of all resources for the entire network at step 518. This is similar to step 510, but may occur at any time, not only when a slave contacts the master. When the master would otherwise be idle, or periodically, the resource allocation and scheduling procedures 394 (FIG. 3A) determine a preferred schedule for transferring blocks to each of the slaves at step 520. This schedule is then stored in the scheduler at step 522. Thereafter, whenever a slave contacts the master for instructions, i.e., sends the master its state, the master simply locates the next schedule for that slave from its stored schedules and transmits that schedule to the slave. This allows the master to periodically compute the sequence or schedule of all copies to all slaves, and then as each slave requests a file the master sends the slave instructions. This also reduces the computational demands on the system by utilizing the master to perform scheduling when it would otherwise be idle.

In some embodiments, global scheduling is performed only for copy operations requiring use of the trunk lines. Global scheduling is performed periodically (e.g., once every N seconds), using a cost function designed to optimize use (or make efficient use) of the trunk lines. When a slave device sends its status information to the master and requests file copy instructions, the master checks to see if a copy operation has been scheduled for that slave device based on global scheduling. If so, instructions are sent to the requesting slave to perform that copy operation. Otherwise, local scheduling is performed to select a best copy operation to be performed by the requesting slave.

In some embodiments, global scheduling is performed only at the FileSet level. In other words, the global schedule specifies, for each slave, only that a file (i.e., any file) within a FileSet should be copied, as well as the datacenter, and optionally rack, from which the file should be copied. Global scheduling is performed periodically, using a cost function designed to optimize use (or make efficient use) of the trunk lines. When a slave devices sends its status information to the master and requests file copy instructions, the master checks to see if a copy operation has been scheduled for that slave device based on global scheduling. If so, the slaves which have the same FileSet as the requesting slave, and which are within the specified datacenter, and optionally rack, are considered, and local scheduling is performed (but only considering the slaves in the specified datacenter or datacenter and rack) to select a best copy operation (e.g., a specific slave and a specified file block) to be performed by the requesting slave.

Figure 5D:
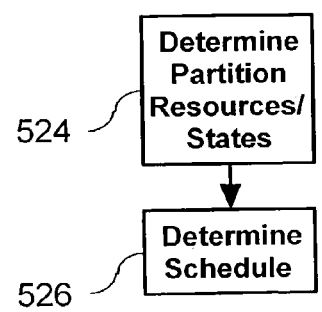

FIG. 5D shows hierarchical or partitioned scheduling 506. Here, every time a slave contacts the master, the master only examines the states and resources of potential copy sources that are nearby, thereby processing fewer potential copy sources. In particular, in hierarchical scheduling 506, once the master has received the first slave's state at step 424 (FIG. 4), the allocation and scheduling procedures 394 (FIG. 3A) determine: the incremental system hierarchy of all slaves and racks in a particular virtual or physical part of the network 100 (FIG. 1) in which the requesting slave (the first slave) is located, from the system hierarchy table 380 (FIGS. 3A and 3B); the system resources from the system resources table 382 (FIGS. 3A and 3C) for all resources in the particular virtual or physical part of the network 100 (FIG. 1) in which the requesting slave (the first slave) is located; all pending transmissions in the particular virtual or physical part of the network 100 (FIG. 1) in which the requesting slave (the first slave) is located, from the pending transmissions table 384 (FIGS. 3A and 3D); and the states of all resources in the particular virtual or physical part of the network 100 (FIG. 1) in which the requesting slave (the first slave) is located, from the state table 390 (FIGS. 3A and 3E). Based on the above, the allocation and scheduling procedures 394 (FIG. 3A) then determine a preferred schedule for transferring a block to the first slave at step 526.

In some embodiments, part of determining the preferred schedule involves determining the optimal window size for each data transfer. The window size is determined and sent by the master to the slave as part of the copy instructions to be executed. The window size is the maximum number of data packets that can be transmitted without additional authorization from the receiving device. If the window size is too small, data is transferred too slowly, while if the window size is too large excessive resources are consumed, as packet losses require excessive retransmits. Therefore, during scheduling, the resource allocation and scheduling procedures 394 (FIG. 3A) preferably calculate the window size as follows. The path between the sending slave (1st Slave) and the receiving slave (2nd Slave) is determined from the system hierarchy table 380 (FIG. 3B) and/or the trunk level bandwidth graph 328 (FIG. 3C). The lowest bandwidth along the path, i.e., the bottleneck in the transmission, is determined from the system resources table 382 (FIG. 3C). The latency along the path is calculated by summing all latencies along the path from the trunk level bandwidth graph 328 (FIG. 3C) of the system resources table 382 (FIG. 3C), i.e., summing the latencies of all trunks along the path. In some embodiment, latencies associated with the rack switches and datacenter switches in the path are also included in the summing of latencies. The window size is then calculated as a function of the lowest bandwidth along the path and the sum of all the latencies along the path. In other words, window size=Function((lowest bandwidth along path) *($\Sigma$latencies along path))

Latencies, may be input manually or automatically into the trunk level bandwidth graph 328 (FIG. 3C), such as by periodically performing pings, etc.

In an alternate embodiment, the window size for a particular transfer may be set manually and stored within the master. For instance, the window size may be manually set for transfers between any slave in datacenter DC1 to any slave in datacenter DC2. Furthermore, window sizes may be manually set for all possible data transfers between datacenters. A separate window size may be manually set for all data transfers within a datacenter.

A further feature of the above described system allows for slaves and masters to fail, be removed from service, be replaced, etc. For example, if a slave fails or is removed from service, the failure count for that slave will rise until the slave is designated as bad. If the slave is replaced or comes back online, one of two things happen. First, the failure count for the slave will eventually drop below the predetermined failure threshold (or recovery threshold, if different) and the master again assumes that the slave is functioning. Second, if the slave sends its state to the master, the master then knows that the slave is operating. Similarly, if a master is replaced, the new master starts off without any slave states of any of the slaves in the system. However, over a short period of time all the slaves send their states to the master, which eventually assembles the states of all the slaves and begins scheduling data distribution.

The foregoing descriptions of specific embodiments of the present invention are presented for purposes of illustration and description. For example, any methods described herein are merely examples intended to illustrate one way of performing the invention. They are not intended to be exhaustive or to limit the invention to the precise forms disclosed. Obviously many modifications and variations are possible in view of the above teachings. Furthermore, if feasible, any single component described herein may be replaced with more than one of the same component, or multiple components may be incorporated into a single component. Also, any graphs described herein are not drawn to scale. The embodiments were chosen and described in order to best explain the principles of the invention and its practical applications, to thereby enable others skilled in the art to best utilize the invention and various embodiments with various modifications as are suited to the particular use contemplated. Furthermore, the order of steps in the method are not necessarily intended to occur in the sequence laid out. It is intended that the scope of the invention be defined by the following claims and their equivalents.

What we claim is:

1. A method for distributing data over a wide area network, comprising:

receiving at a master, coupled to a plurality of slaves, a slave state of a first slave of said plurality of slaves, wherein the slave state of the first slave includes a current file length, for each of a plurality of files stored at the first slave, the current file length of each respective file representing an amount of the respective file currently stored at the first slave;

determining at said master that said first slave requires data;

selecting at said master, in accordance with a predefined bandwidth resource allocation method, a second slave of said plurality of slaves from which to transfer said data to said first slave;

scheduling at said master, a data transfer of said data from said second slave to said first slave;

transmitting instructions from said master to said first slave, instructing said first slave to obtain said data from said second slave; and after transmitting the instructions, receiving from said first slave a revised state of said first slave, and subsequently repeating the determining, scheduling and transmitting operations.

2. The method of claim 1, wherein said slave state of said first slave is a saved current state of file storage of said first slave including an indication of files that said first slave requires and an indication of what portion, if any, of a particular one of the files that said first slave has already stored in memory.

3. The method of claim 1, wherein said selecting said second slave further comprises:
determining which available slaves of said plurality of slaves have said data;
ascertaining system resources; and
establishing that said second slave is a preferred slave, from said available slaves, from which to transfer said data to said first slave, based on said system resources.

4. The method of claim 3, wherein said ascertaining further comprises:
determining differences between maximum system resources of the system and resources in use.

5. The method of claim 1, wherein said scheduling further comprises:
determining overall system resources; and
establishing that said second slave is a preferred slave from which to transfer said data to said first slave based on said overall system resources.

6. The method of claim 1, wherein said scheduling further comprises:
determining incremental system resources that have changed since last determining said incremental system resources; and
establishing that said second slave is a preferred slave from which to transfer said data to said first slave based on said incremental system resources.

7. The method of claim 1, wherein said scheduling further comprises:
determining partition system resources of a partition of system components that includes said first slave; and
establishing that said second slave is a preferred slave from which to transfer said data to said first slave based on said partition system resources.

8. The method of claim 1, further comprising, at any time before said scheduling:
determining at said master, overall system resources;
computing at said master, a preferred data transfer schedule based on said overall system resources;
storing said data transfer schedule on said master, such that said scheduling further comprises selecting said instructions from said data schedule.

9. A method for distributing data over a wide area network, comprising:
transmitting a file set from a master, coupled to a plurality of slaves, to a first slave of a plurality of slaves, where said file set is a list of files and version numbers of said files that said first slave must obtain, receiving at said master a slave state of said first slave of said plurality of slaves, wherein the slave state of the first slave includes a current file length, for each of the files in the list of files in said file set, the current file length of each respective file representing an amount of the respective file currently stored at the first slave;

determining at said master that said first slave requires data;

selecting at said master, in accordance with a predefined bandwidth resource allocation method, a second slave of said plurality of slaves from which to transfer said data to said first slave;

scheduling at said master, a data transfer of said data from said second slave to said first slave; and transmitting instructions from said master to said first slave, instructing said first slave to obtain said data from said second slave.

10. The method of claim 9, further comprising, after said obtaining:
ascertaining at said first slave, said state of said first slave; and
transmitting said state to said master.

11. The method of claim 10, wherein said state is ascertained by establishing what data said first slave still requires.

12. The method of claim 11, wherein said establishing further comprises subtracting data already stored on said first slave from that required per said file set.

13. The method of claim 1, further comprising:
receiving said instructions at said first slave;
requesting said data from said second slave;
receiving at said first slave said data from said second slave; and
storing said data on said first slave.

14. The method of claim 13, wherein said ascertaining further comprises determining whether said transfer of said data from said second slave to said first slave was successful.

15. The method of claim 14, wherein if said transfer of said data was unsuccessful:
assessing at said first slave failure information identifying components of said WAN responsible for said unsuccessful transfer; and
storing said failure information in said state, such that said failure information is transferred to said master.

16. The method of claim 15, further comprising:
incrementing a count for each component of said WAN that has been identified as being responsible for an unsuccessful transfer;
identifying a component of said WAN as failed when said count reaches a predetermined number.

17. The method of claim 13, further comprising verifying said data.

18. The method of claim 13, further comprising:
determining that no more data is required for a particular file; and
updating said state to show that no more data is required for said particular file.

19. The method of claim 1, further comprising, before said receiving:
generating said data at a generator;
generating a checksum of said data at said generator; and
sending said data and said checksum to said second slave.

20. The method of claim 19, further comprising, before said sending:
generating a final flag at said generator, where said final flag indicates that said data is a final block of data for a particular file, such that said final flag is sent to said second slave together with said data and said checksum.

21. The method of claim 20, further comprising:
receiving said data at said second slave; and
storing said data on said second slave.

22. The method of claim 21, further comprising, after said second slave receives said data, verifying said data based on said checksum.

23. A system for distributing data, comprising:
a plurality of dispersed slaves configured to store and serve data;
at least one generator configured to generate said data and to make said data available to a subset of said plurality of slaves; and
a master coupled to said plurality of dispersed slaves, where said master is configured to:
transmit a file set to a first slave of a plurality of slaves, where said file set is a list of files and version numbers of said files that said first slave must obtain;
receive state information from a first slave of said plurality of slaves, wherein the state information from the first slave includes a current file length, for each of the files in the list of files in said file set, the current file length of each respective file representing an amount of the respective file currently stored at the first slave;
determine that said first slave requires data;
select, in accordance with a predefined bandwidth resource allocation method, a second slave of said plurality of slaves from which to transfer said data to said first slave;
schedule a data transfer of said data from said second slave to said first slave; and
transmit instructions from said master to said first slave, instructing said first slave to obtain said data from said second slave.

24. The system of claim 23, wherein said master comprises:
a processor;
communications circuitry; and
a memory, comprising:
an operating system;
communication procedures for communicating with said plurality of slaves via said communication circuitry;
an indication maximum of system resources;
an indication of system resources in use;
an indication of a state of each slave; and
a scheduler for scheduling data transfer between slaves.

25. The system of claim 24, wherein each slave of said slaves further comprises:
a processor;
communications circuitry; and
a memory, comprising:
an operating system;
communication procedures for communicating with said plurality of slaves and said master via said communication circuitry;
a file set file containing a list of files required by said slave; and
at least a portion of one of said files and an indication of how much of said file is still required.

26. The system of claim 24, wherein said master and each of said slaves include verification procedures for verifying said data.

27. A method for distributing a plurality of files over a network, comprising:
at each slave of a plurality of slaves, determining a current file length for each of the plurality of files, the current file length of each respective file representing an amount of the respective file currently stored at the slave, and sending slave status information to a master, the slave status information including the current file length for each of the plurality of files;
at the master, receiving the slave status information from each of the slaves;
at the master, scheduling copy operations based on the slave status information received from the slaves, each scheduled copy operation for copying a specified portion of a specified file of the plurality of files, from a first specified slave of the plurality of slaves to a second specified slave of the plurality of slaves; and
at the master, storing bandwidth capability information indicating data transmission bandwidth capabilities for a plurality of resources required for transmitting data between the plurality of slaves, and storing bandwidth usage information indicating amounts of data transmission bandwidth allocated to copy operations scheduled by the master, the stored bandwidth usage information indicating a total allocated bandwidth for each resource of the plurality of resources;
the scheduling including allocating for each copy operation an amount of data transmission bandwidth with respect to each resource required by the copy operation, and updating the stored bandwidth usage information in accordance therewith;
the scheduling further including only scheduling copy operations that do not cause the total allocated bandwidth of any resource to exceed the bandwidth capability of that resource.

28. The method of claim 27, wherein a first file of the plurality of files includes a first set of blocks and a second set of blocks, the method including:
executing the copy operations scheduled by the master; and
at one of the slaves, generating the second set of blocks of the first file after at least one block of the first file has been copied to another one of the slaves by the execution of a respective copy operation scheduled by the master.

29. The method of claim 27, wherein the scheduling includes applying a cost function to a plurality of potential copy operations to produce a respective score for each potential copy operation, selecting a copy operation of the plurality of potential copy operations having a best score, and scheduling the selected copy operation.

30. The method of claim 9, wherein said slave state of said first slave is a saved current state of file storage of said first slave including an indication of files that said first slave requires and an indication of what portion, if any, of a particular one of the files that said first slave has already stored in memory.

31. The method of claim 9, wherein said selecting said second slave comprises:
determining which available slaves of said plurality of slaves have said data;
ascertaining system resources; and
establishing that said second slave is a preferred slave, from said available slaves, from which to transfer said data to said first slave, based on said system resources.

32. The method of claim 31, wherein said ascertaining further comprises:
determining differences between maximum system resources of the system and resources in use.

33. The method of claim 9, wherein said scheduling further comprises:
- determining overall system resources; and
- establishing that said second slave is a preferred slave from which to transfer said data to said first slave based on said overall system resources.

34. The method of claim 9, wherein said scheduling further comprises:
- determining incremental system resources that have changed since last determining said incremental system resources; and
- establishing that said second slave is a preferred slave from which to transfer said data to said first slave based on said incremental system resources.

35. The method of claim 9, wherein said scheduling further comprises:
- determining partition system resources of a partition of system components that includes said first slave; and
- establishing that said second slave is a preferred slave from which to transfer said data to said first slave based on said partition system resources.

36. The method of claim 9, further comprising, at any time before said scheduling:
- determining at said master, overall system resources;
- computing at said master, a preferred data transfer schedule based on said overall system resources;
- storing said data transfer schedule on said master, such that said scheduling further comprises selecting said instructions from said data schedule.

37. A system for distributing data, comprising:
- a plurality of dispersed slaves configured to store and serve data;
- at least one generator configured to generate said data and to make said data available to a subset of said plurality of slaves; and
- a master coupled to said plurality of dispersed slaves, where said master is configured to:
  - receive state information from a first slave of said plurality of slaves, wherein the slave information from the first slave includes a current file length, for each of a plurality of files stored at the first slave, the current file length of each respective file representing an amount of the respective file currently stored at the first slave;
  - determine that said first slave requires data;
  - select, in accordance with a predefined bandwidth resource allocation method, a second slave of said plurality of slaves from which to transfer said data to said first slave;
  - schedule a data transfer of said data from said second slave to said first slave;
  - transmit instructions from said master to said first slave, instructing said first slave to obtain said data from said second slave; and
  - after transmitting the instructions, receive from said first slave a revised state of said first slave, and subsequently repeat the determining, scheduling and transmitting operations.

38. A computer readable storage medium storing one or more programs for execution by one or more processors of a master system so as distribute data among a plurality slaves, the one or more programs comprising instructions for:
- receiving at the master system a slave state of a first slave of said plurality of slaves, wherein the slave state of the first slave includes a current file length, for each of a plurality of files stored at the first slave, the current file length of each respective file representing an amount of the respective file currently stored at the first slave;
- determining, at the master system, that said first slave requires data;
- selecting, in accordance with a predefined bandwidth resource allocation method, a second slave of said plurality of slaves from which to transfer said data to said first slave;
- scheduling a data transfer of said data from said second slave to said first slave;
- transmitting instructions from said master system to said first slave, instructing said first slave to obtain said data from said second slave; and
- after transmitting the instructions, receiving from said first slave a revised state of said first slave, and subsequently repeating the determining, scheduling and transmitting operations.

39. The computer readable storage medium of claim 38, wherein said slave state of said first slave is a saved current state of file storage of said first slave including an indication of files that said first slave requires and an indication of what portion, if any, of a particular one of the files that said first slave has already stored in memory.

40. The computer readable storage medium of claim 38, wherein said instructions for selecting said second slave include instructions for:
- determining which available slaves of said plurality of slaves have said data;
- ascertaining system resources; and
- establishing that said second slave is a preferred slave, from said available slaves, from which to transfer said data to said first slave, based on said system resources.

41. The computer readable storage medium of claim 38, the one or more programs further including instructions for:
- determining at said master, overall system resources;
- computing at said master, a preferred data transfer schedule based on said overall system resources; and
- storing said data transfer schedule on said master, such that said instructions for scheduling include instructions for selecting from said data schedule said instructions to transmit to said first slave.

42. A computer readable storage medium storing one or more programs for execution by one or more processors of a master system so as distribute data among a plurality slaves, the one or more programs comprising instructions for:
- transmitting a file set from the master system to a first slave of a plurality of slaves, where said file set is a list of files and version numbers of said files that said first slave must obtain,
- receiving at said master system a slave state of said first slave of said plurality of slaves, wherein the slave state of the first slave includes a current file length, for each of the files in the list of files in said file set, the current file length of each respective file representing an amount of the respective file currently stored at the first slave;
- determining at said master system, that said first slave requires data;
- selecting at said master system, in accordance with a predefined bandwidth resource allocation method, a second slave of said plurality of slaves from which to transfer said data to said first slave;
- scheduling a data transfer of said data from said second slave to said first slave; and
- transmitting instructions from said master system to said first slave, instructing said first slave to obtain said data from said second slave.

* * * * *